(No Model.) 2 Sheets—Sheet 1.
W. LEWIS.
MACHINERY FOR TRANSMITTING AND ARRESTING MOTION.
No. 352,623. Patented Nov. 16, 1886.
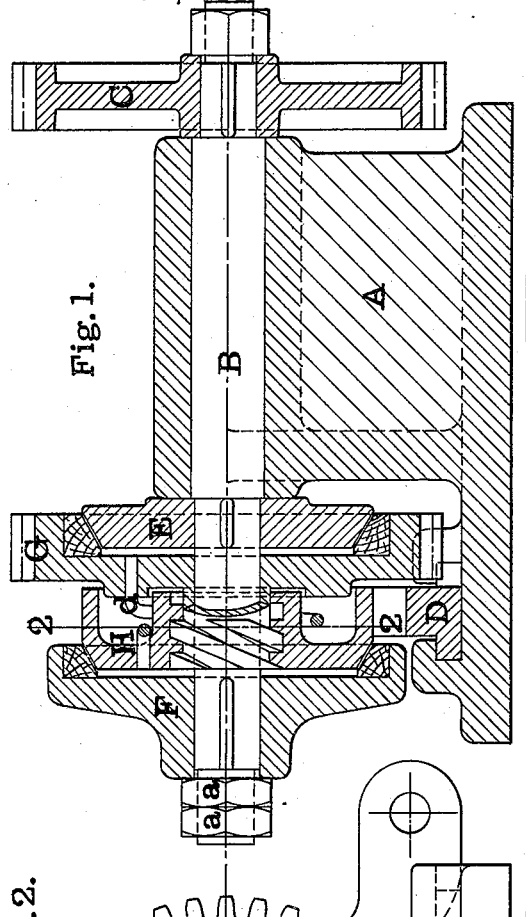
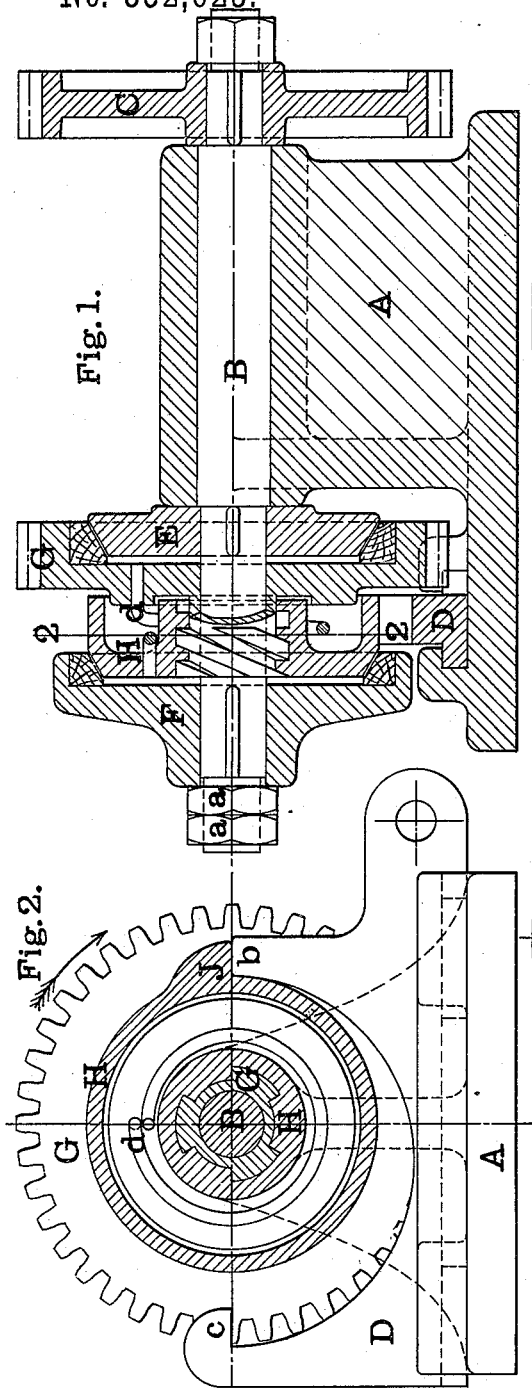
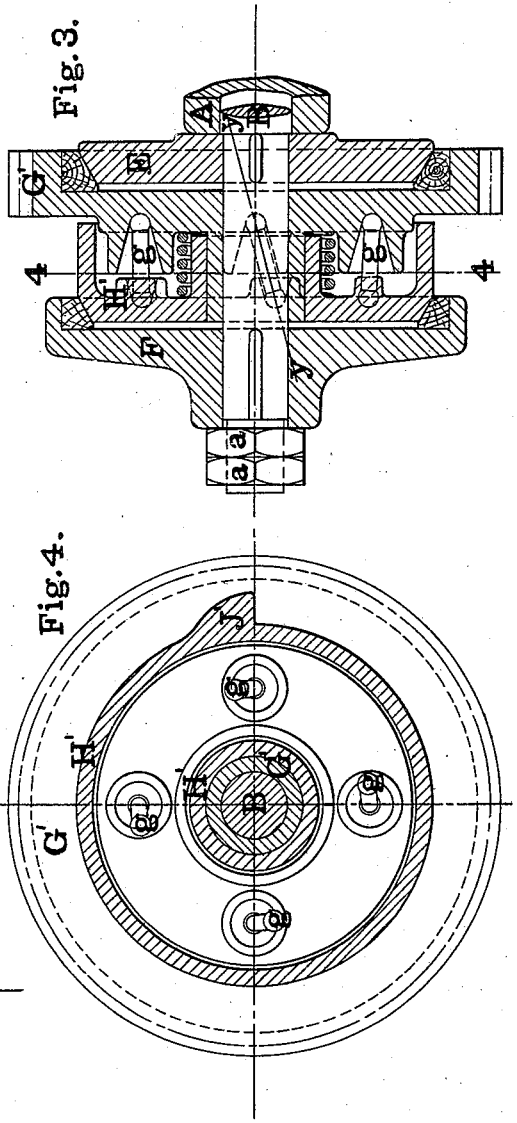
WITNESSES.
INVENTOR.
Wilfred Lewis (No Model.) 2 Sheets—Sheet 2.
W. LEWIS.
MACHINERY FOR TRANSMITTING AND ARRESTING MOTION.
No. 352,623. Patented Nov. 16, 1886.
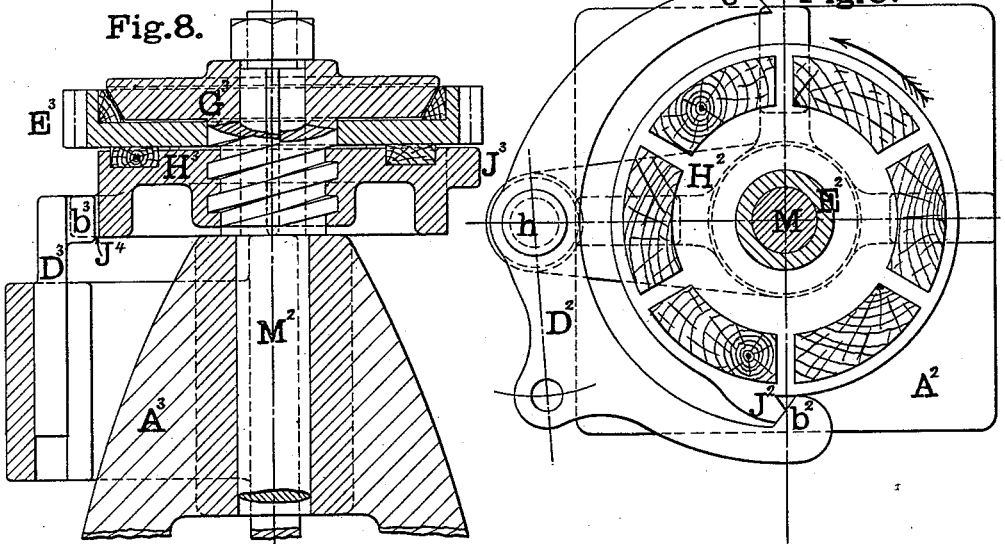
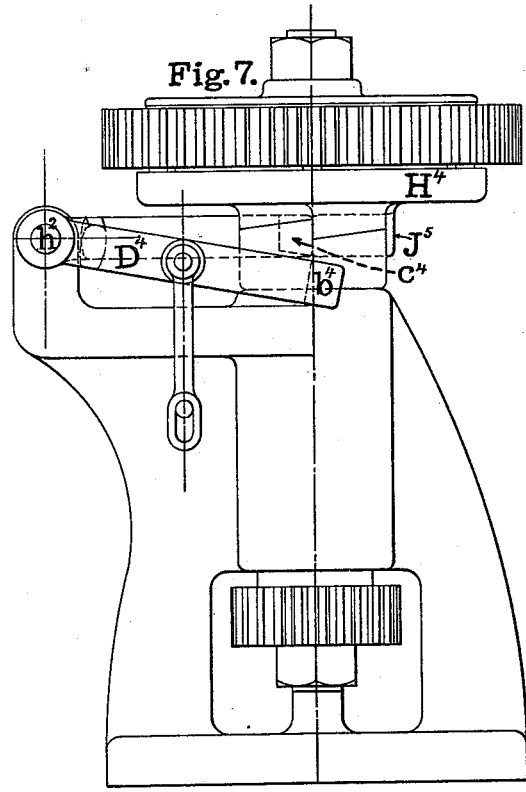
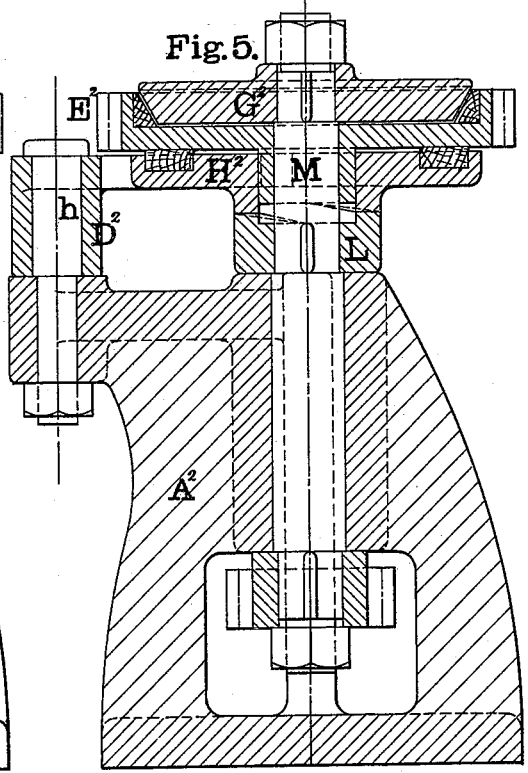
WITNESSES. INVENTOR.

UNITED STATES PATENT OFFICE.

WILFRED LEWIS, OF PHILADELPHIA, PENNSYLVANIA, ASSIGNOR TO WILLIAM SELLERS & COMPANY, (INCORPORATED,) OF SAME PLACE.

MACHINERY FOR TRANSMITTING AND ARRESTING MOTION.

SPECIFICATION forming part of Letters Patent No. 352,623, dated November 16, 1886.

Application filed May 13, 1886. Serial No. 202,103. (No model.)

*To all whom it may concern:*

Be it known that I, WILFRED LEWIS, of the city and county of Philadelphia, and State of Pennsylvania, have invented certain new and useful Improvements in Machinery for Transmitting and Arresting Motion, of which improvements the following is a specification.

My present invention relates to that class of machinery in which a train of gearing is required to be operated or driven intermittently by another train which operates continuously, and for which purpose the device known as a "ratchet-wheel and pawl" has hitherto been employed. This device has many inherent defects. When the pawl is released from its detent so as to engage with the ratchet-wheel for the purpose of driving the train, the arriving tooth of the wheel is frequently so close at the time of release that the pawl is unable to fully engage with it, and the driving is done by so much of the surface as happens to be engaged. If this surface is not sufficient, as is frequently the case, the pawl will be driven out of gear with that tooth to engage with the succeeding one, and this action wears away or breaks the edges of the pawl and teeth. When it is desired to arrest the motion of the driven train, the driving end of the pawl must be disengaged by sliding over the surface of the driving-tooth while it is still doing work. This also has a tendency to wear away and deform the engaging faces. These defects soon become apparent even in the lightest constructions; but as the driven train must necessarily be started at its full speed the moment the pawl strikes a tooth of the driving-wheel, the shock becomes more destructive as the weight of the parts to be set in motion is increased, so that practically this device is limited to very light work.

It is the object of my present invention to combine the advantages of the positive and definite action of the ratchet-wheel and pawl with the extended surface and freedom from shock of the friction-clutch for the purpose of transmitting and arresting motion; and to this end my invention consists in connecting two frictional members of the driven train in such manner that the angular adjustment of one of them about its axis will cause their frictional surfaces to approach or recede from each other; and it further consists in providing means for automatically effecting the angular adjustment of these two members with each other; and it further consists in providing a retaining device, which maintains the relative distance of the frictional surfaces of these two members from each other so long as it is in gear with one of them; and it further consists in providing the driving-train with a frictional member or members that will engage with those of the driven train when the retaining device releases the engaging member of the driven train, and in disengaging them by arresting the movement of the engaging frictional member; and it further consists in combining all of the frictional surfaces in such manner that the pressure upon these surfaces will increase with the resistance offered by the driven train.

In the accompanying drawings, which form part of this specification, Figure 1, Sheet 1, is a sectional elevation of one form of my present invention as applied to a horizontal shaft. Fig. 2 is an end elevation, partly in section on the line 2 2, of the parts shown in Fig. 1. Fig. 3 is a sectional elevation of another method of connecting the frictional members of the driven train. Fig. 4 is a sectional end elevation of the parts shown in Fig. 3 on the line 4 4. Fig. 5, Sheet 2, is a sectional elevation of another form of my present invention as applied to a vertical shaft. Fig. 6 is a plan of the construction shown in Fig. 5, partly in section. Fig. 7 is an elevation showing my invention applied to an upright shaft, with another arrangement of the escapement-plate for arresting the motion of the engaging frictional members of the driven train. Fig. 8 is a sectional elevation showing another method of connecting the frictional members and another arrangement of the escapement-plate for arresting their motion.

A, Fig. 1, Sheet 1, represents a stand, forming a bearing for the shaft B and a guide for the escapement-plate D. The shaft B has secured to it on one end the gear-wheel C, by which it is continuously rotated in the direction of the arrow, Fig. 2. At the other end of the bearing the shaft B carries firmly secured to it so as to revolve with it the driving abutment-plate E, and the tightening abutment-plate F, which is secured to the shaft B by a feather, so as to revolve with it, but so as to be adjustable along the shaft by means of the lock-nuts *a a*, for a purpose hereinafter described.

The gear-wheel G fits loosely on the shaft B, which carries it, and is formed with a friction-surface on its side which engages with a corresponding surface on the driving-plate E, one of these surfaces being preferably lined with wood to prevent seizing and to provide some elasticity, so that the maximum pressure will be attained more gradually. This gear G is the transmitting frictional member of the driven train and imparts motion to any train of machinery that may be connected with it when it is engaged with the driving-train, as hereinafter described. It is not essential that the wheel G should be provided with teeth, as it may be in the form of an eccentric; or it may transmit motion by friction or by belts, depending upon the nature of the train to be driven, the gear form being shown for convenience only.

The gear G is formed with a hub provided, as shown, with a quick-pitch thread which engages with a corresponding thread formed in the hub of the engaging frictional member or block H. Both the wheel G and engaging-block H may be carried by the shaft and provided with cam-faces instead of the screw-thread shown, if it is preferred.

The engaging-block H is formed so as to engage with a frictional surface on the tightening-plate F, preferably lined with wood, and is provided on its periphery with a lug, J, which strikes against the stops *b* and *c*, respectively, on the escapement-plate D for a purpose presently described.

The driving abutment-plate E and the tightening abutment-plate F are the frictional members of the driving-train that rotate continuously, and the gear-wheel G and engaging-block H are the two frictional members of the driven train to which motion is to be transmitted.

The operation of the device is as follows: The gear-wheel C and shaft B revolving in the direction of the arrow, Fig. 2, the lug J resting on the stop *b*, if the escapement-plate D is moved to the right the lug J will be released, and the spiral spring *d*, between the frictional members, the gear-wheel G, and engaging-block H will tend to separate these pieces and press the engaging-block H against the revolving tightening abutment-plate F, by which it is to be driven. On account of the difference in diameter between the screw-thread and the frictional surfaces, and also the difference in the angles of these surfaces, the plate F will screw the engaging-block H along the hub of the gear-wheel G, which is held from turning by the resistance of the train it is to drive, and this angular adjustment will cause the frictional surfaces on the gear-wheel G and engaging-block H to recede from each other until the gear-wheel G is clamped between the driving-plate E and the screw-thread on the block H with sufficient force to drive the wheel G with its train of mechanism whatever it may be. It will be evident, if the engaging-block H will turn easier on the screw-thread than on the frictional surface on the plate F, and this relation between these surfaces is essential for the operation of the device, that until the wheel G attains the speed of rotation of the driving-plate E the pressure between the frictional surfaces on this wheel G and plate E must increase until this speed is attained, for the engaging-block H must from the conditions laid down turn with the same speed as the tightening-plate F from the moment it touches it, and therefore any difference in rotative speed between the block H and gear G under these conditions must press the gear G and plate E more firmly together. This strain tends to separate the abutment-plates F and E, and therefore produces a strain of tension on the shaft B, and the amount of this tensional strain resulting from the pressure between the driving-surfaces depends upon the diameter and angle of the frictional surfaces between the driving-plate E and gear G, and on those between the gear G and engaging-block H. In all cases, however, these angles should be such as to free themselves when the clamping-pressure is removed. The wheel G will now revolve with the same velocity as the plate E, and it will be evident that no resistance short of breakage will be capable of stopping it, for from the foregoing description it must be clear that it must tighten in proportion to the resistance, and hence its action of driving will be positive while the surfaces engaged for driving are the areas of the frictional surfaces between the gear G and the driving-plate E, and of the screw-threads or inclined surfaces between the gear G and engaging-block H.

It is not essential to the operation of the device that the frictional surface between the gear G and the plate E should have greater frictional movement than that between the gear G and engaging-block H; but I prefer to make it as shown in order to diminish the pressure on the screw-threads.

When the escapement-plate D was moved to the right, so as to release the lug J from the stop *b*, the stop *c* was by the same motion drawn in, so as to be in position to engage with the lug J when it had completed a half-turn. The revolution of the engaging-block H is thus arrested, and the pressure on the screw-thread and driving-surfaces is released by the forward motion of the gear G relatively to the block H until by this angular adjustment the frictional surfaces of the gear G and block H approach each other sufficiently to release the driving frictional surfaces, which are then held in contact only by the pressure due to the light spring *d*. It is clear that the stop *c* may be at such a distance that both it and the stop *b* can be placed so as to clear the lug J, in which case the driven train will revolve continuously until one or the other stop is thrown in gear, so as to arrest the engaging-block H. The engaging-block H stops in positions accurately determined by the stops $b$ and $c$, and the position of the gear G relatively to these stops, or to any desired position of the driven train, may be determined by adjusting the distance between the plates E and F—as, for example, by moving the tightening abutment-plate F along the shaft by means of the lock-nuts $a\ a$, and so forcing the gear G to take a different angular position relatively to the stops J by reason of the screw or cam connection between the gear G and block H. The function of the spring $d$ is to press the block H against the plate F, to produce the necessary friction to rotate the engaging-block when released by the escapement-plate, and this pressure could be produced by a spring placed between the plate E and gear G, though in this case the spring would exert end pressure only, as it could not be fastened to both pieces in the manner indicated in Fig. 1, where it acts by torsion. If, however, the stand A is placed so that the gear C is at the top, then no spring would be required, for the weight of the gear G and block H resting on the plate F would be sufficient to produce the necessary friction for rotating the engaging-block, and the device would operate perfectly without the spring, the choice between the use of the force of gravity or the elastic force of a spring depending upon the position in which the device for transmitting motion is placed.

Figs. 3 and 4 show a modification of the parts shown in Figs. 1 and 2, the screw-threads between the gear G and engaging-block H being replaced by the inclined struts or rocking pieces $g\ g$, provided with spherical ends which rest in seats provided in the gear G' and engaging-block H', and which are placed at an angle with the axis, as indicated by the dotted line $y\ y$ in Fig. 3, whereby the angular motion of the engaging-block H' in one direction relatively to the gear G' will bring the pieces $g\ g$ more nearly parallel with the shaft B, and hence this angular movement of the block H' will increase the distance between the frictional driving-surfaces of the block H' and gear G', while the angular movement in the opposite direction will release them, thus acting in the same manner as the screw-threads hereinbefore described.

Fig. 5, Sheet 2, shows a modification of my present invention as applied to a vertical shaft, in which $E^2$ is the driving-gear or frictional member of the driving-train, which rotates continuously in the direction of the arrow, Fig. 6, and runs loosely on the shaft M, its weight being carried by the engaging-block $H^2$, one of the frictional surfaces between them being preferably of wood. The lower end of the hub of the engaging-block $H^2$ is provided with inclined or cam surfaces which rest upon corresponding surfaces on the collar L, firmly secured to the shaft M, which connects it rigidly with the plate $G^2$, also secured to this shaft. The plate $G^2$ is formed with a conical friction-surface fitting into a corresponding surface, preferably lined with wood, on the driving-gear $E^2$, the upper side of which gear thus corresponds to the driving-plate E and the lower side to the tightening-plate F of Figs. 1 and 2. The two frictional surfaces on the driving-gear $E^2$ thus form the two frictional members of the driving-train. The shaft M is carried in a bearing, $A^2$, as shown, and to the lower end is secured a gear to transmit motion to the rest of the driven train. The lug $J^2$, Fig. 6, is shown as resting against the stop $b^2$ on the escapement-plate $D^2$, which is pivoted at $h$, as shown, and swings about this pivot so as to engage the stops $c^2$ or $b^2$ as required with the lug $J^2$. When the lug $J^2$ is released by moving the stop $b^2$ away, the friction between the rotating gear $E^2$ and engaging-block $H^2$ is sufficient on account of the weight of the gear $E^2$ to revolve the engaging-block on the cam-faces on the collar L, and so lift the block $H^2$ and the gear $E^2$ until the gear $E^2$ is pressed firmly against the plate $G^2$, the gear $E^2$ being thus firmly clamped between the plate $G^2$ and engaging-block $H^2$, which are the frictional members of the driven train, with sufficient force to drive the shaft M and whatever may be coupled to it. This revolution will continue until the pressure between the frictional surfaces is released by arresting the motion of the engaging-block $H^2$ by the engagement of the lug $J^2$ with the stops $b^2$ or $c^2$.

Fig. 7 shows an arrangement similar to that in Fig. 5, excepting that the escapement-plate $D^4$ is pivoted about a horizontal axis, at $h^4$, instead of a vertical one, and the stop $c^4$ is indicated in dotted lines as engaged with the lug $J^5$ on the back of the engaging-block $H^4$, the front stop, $b^4$, being in the position in which it releases the lug $J^5$. When the escapement-plate is raised, the stop $c^4$ will be lifted clear of the lug $J^5$, which it thus releases, while at the same time the stop $b^4$ is raised to the proper height to arrest the lug $J^5$ on completing a half-turn.

Fig. 8 shows a modification, in which the plate $G^3$, secured to the shaft $M^2$, is provided with a hub having a screw-thread which engages with a corresponding screw-thread formed in the hub of the engaging-block $H^4$. This screw-thread by the angular adjustment of the block $H^3$ relatively to the transmitting frictional member—the plate $G^3$—causes the frictional surfaces of these two pieces to approach or recede from each other, thus acting substantially in the same manner as the cam-faces on the engaging-block $H^2$ and collar L in Fig. 5. The engaging-block $H^3$ is shown as provided with two lugs, $J^3$ and $J^4$, in different planes of rotation, while the escapement-plate $D^3$ is shown with but one stop, $b^3$, which is shown engaged with the lug $J^4$. If the escapement-plate is raised, this lug will be released, while the stop $b^3$ will then be in proper position to engage with the lug $J^3$ when the engaging-block completes a half-revolution.

It will be evident that any form of escapement-plate that will arrest and release the engaging-block may be used, and in cases where the driven train is required to operate for considerable intervals of time the engaging-block can be controlled by a friction-brake capable of arresting its motion—that is, the particular method of arresting and releasing the frictional engaging-block is not essential.

In all forms of my present invention it is essential that the frictional resistance on the connection between the engaging block and the other frictional member of the driven train should be less than that on the frictional surface that rotates the engaging-block. In all cases the cam or inclined faces, or screw-threads, or connections, by which the distance between the frictional surfaces of the driven train is varied, must be between the engaging-block and a part of the mechanism to which motion is to be imparted, and it will be evident that the mechanism in all cases is clutched, so as to be driven by moving the engaging-block in one direction and arrested or unclutched by moving it in the opposite direction relatively to the other frictional member of the driven train.

I am aware that trains of gearing have been constructed in which two frictional members have been connected, so that angular adjustment of either of them would cause their frictional surfaces to approach or recede from each other; but in all cases previous to my present invention these frictional members have been both on the driving-train, or one on the driving-train and one on the driven train; but as thus arranged the driven train could be arrested only by arresting the motion of the driving-train, thus differing essentially from my present invention, in which these frictional members—that is, those which approach and recede from each other—are both on the driven train, whereby the driving-train may rotate continuously, and the driven train can be disconnected and its motion arrested by arresting the motion of one of its frictional members; or it may be reconnected by releasing one of its frictional members.

Having now described my invention, what I claim as new, and desire to secure by Letters Patent, is—

1. In machinery for transmitting and arresting motion, a frictional member of a driving-train, in combination with two frictional members of a driven train, connected substantially as described, whereby the angular adjustment of one of the driven frictional members about its axis will cause their frictional surfaces to approach or recede from each other, as and for the purposes described.

2. In machinery for transmitting and arresting motion, two frictional members of the driven train, in combination with a frictional member of the driving-train, and means, substantially as described, whereby one of the frictional members of the driven train is brought in contact with the frictional member of the driving-train, as and for the purposes described.

3. In machinery for transmitting and arresting motion, a driving-train provided with frictional driving members, in combination with a driven train provided with a transmitting frictional member, an engaging frictional member, and a retaining device, substantially as described, whereby the engaging frictional member of the driven train is prevented from rotating with the driving-train, the combination being and operating substantially as described.

4. In machinery for transmitting and arresting motion, a driving-train provided with frictional driving members, in combination with a driven train provided with a transmitting frictional member and an engaging frictional member, connected substantially as described, whereby the engaging frictional member will rotate with the driving-train when released from the retaining device and engage the driven train with the driving-train, and by arresting the motion of the engaging frictional member the driven train may be disconnected from the driving-train.

5. In machinery for transmitting and arresting motion, a driven train provided with a transmitting frictional member and an engaging frictional member, substantially as described, in combination with a driving-train having frictional driving-surfaces, whereby the resistance offered by the transmitting frictional member will tend to increase the angular adjustment of the two frictional members and engage their surfaces more firmly with the driving train.

WILFRED LEWIS.

Witnesses:
H. W. SELLERS,
DAVID L. LUKENS.